United States Patent
Pfligler et al.

(10) Patent No.: US 6,286,303 B1
(45) Date of Patent: Sep. 11, 2001

(54) IMPINGEMENT COOLED FOIL BEARINGS IN A GAS TURBINE ENGINE

(75) Inventors: John J. Pfligler, Gilbert; Carl A. Larson, Temple; George R. Cunnington, Oro Valley, all of AZ (US)

(73) Assignee: Allied Signal, Inc., Morris Township, NJ (US)

( * ) Notice: Subject to any disclaimer, the term of this patent is extended or adjusted under 35 U.S.C. 154(b) by 0 days.

(21) Appl. No.: 09/442,920

(22) Filed: Nov. 18, 1999

(51) Int. Cl.$^7$ ........................................................... F02C 3/00
(52) U.S. Cl. ........................ 60/39.75; 415/110; 415/111; 415/112; 415/175; 415/176; 415/177; 415/180; 415/229
(58) Field of Search ........................... 60/39.75; 415/110, 415/111, 112, 175, 177, 180, 229

(56) References Cited

U.S. PATENT DOCUMENTS

| | | |
|---|---|---|
| 5,450,719 | 9/1995 | Marsh . |
| 5,827,040 | * 10/1998 | Bosley et al. .......................... 415/106 |
| 6,139,269 | * 10/2000 | Liang ...................................... 416/97 |

* cited by examiner

Primary Examiner—Charles G. Freay
Assistant Examiner—Ed Hayes
(74) Attorney, Agent, or Firm—Robert Desmond, Esq.

(57) ABSTRACT

A foil bearing assembly for use in a gas turbine engine is provided. The assembly includes an annular bearing carrier mounted to the housing of the engine. An annular foil carrier disposed within the bearing carrier and carrying a plurality of overlapping foils that engage an outer surface of a journal. The journal is mounted to the rotating assembly of the engine to define a cavity. Disposed in the cavity is a showerhead having an inlet for receiving a flow of cooling air and a plurality of orifices for providing impingement cooling of the inner surface of the journal. The use of a showerhead in a thrust foil bearing is also disclosed.

20 Claims, 6 Drawing Sheets

IMPINGEMENT COOLED FOIL BEARINGS IN A GAS TURBINE ENGINE

TECHNICAL FIELD

This invention relates generally to gas turbine engines and in particular to gas turbine engines that use foil or air bearings.

BACKGROUND OF THE INVENTION

Foil bearings are currently used in high-speed turbomachinery, and particularly in small air cycle machines where air is used as the lubricant. This eliminates the need for an oil lubrication system, lowering the cost and eliminating maintenance and reliability problems associated with oil systems. Compared to the small air cycle machines, gas turbine engines produce higher loads on the bearings, requiring larger bearings which generate more heat due to fluid friction. Yet the temperature limit for 'state of the art' foil bearings remains the same. The limit is set by the organic material used for coating the foils, which has the purpose of low rubbing friction and tolerance to foreign particles. When the temperature limit is exceeded, experience has shown that the coating material deteriorates and results in rubbing which ultimately produces bearing failure.

Foil bearings in small air cycle machines are cooled by conduction to relatively cool parts of the machine and by forcing cool air to flow through the bearings. In gas turbine engines, parts adjacent to the bearings are not always cooler than the bearings need to be. Also, the cooling air pressure required to force enough air through the bearings may be higher than the available pressure in the engine, especially during operation at high altitudes. Even in cases where enough pressure is available, this method of cooling is not very efficient because most of the air flow bypasses the bearing through the foil retaining slots. In gas turbine engines, cooling air must be used efficiently because of the associated performance penalty, which can increase engine weight and cost.

Heat generation in foil bearings is concentrated in the regions of smallest film thickness, i.e. where the air film separating the foil from the rotating component is less than 0.001 inch thick. Heat must be transferred away from these regions; radially in the case of journal bearings and axially in the case of thrust bearings. The foils are separated from the bearing housing by springs and air gaps to allow for dynamic motion and thermal expansion of the rotating part. This causes high resistance to heat transfer into the bearing housing. The rotating component, however, is always in intimate thermal contact with the air film where heat is generated by viscous shear, and the contact is distributed uniformly over the circumference due to its rotation. Therefore, to facilitate the heat transfer along the path of least resistance, i.e. into the rotating part and achieve the highest possible cooling effectiveness, the rotating part must be cooled directly.

Accordingly, a need exists for an apparatus for providing cooling air flow to the rotating components of journal and thrust foil bearings in gas turbine engines.

SUMMARY OF THE INVENTION

An object of this invention is to provide an apparatus for providing cooling air flow to the rotating components of journal and thrust foil bearings in gas turbine engine.

The present invention achieves this object by providing a gas turbine engine having a housing and a rotating assembly mounted for rotation to said housing on at least one foil journal bearing. The foil journal bearing comprises an annular bearing carrier mounted to the housing; an annular foil carrier disposed within the bearing carrier and attached thereto, a foil carrier carrying a plurality of overlapping foils; a journal mounted to the rotating assembly and having an outer surface that engage the foils; and a showerhead attached to the housing and disposed between said journal and the rotating assembly. The showerhead has an inlet for receiving cooling air and an outer wall with a plurality of orifices to create air jets for delivering impingement cooling air to the inner surface of said journal.

The engine may also have a foil thrust bearing assembly comprising a thrust disk mounted to the rotating assembly; a large thrust foil bearing on one side of the thrust disk; a small thrust foil bearing on the other side of the thrust disk; and a showerhead mounted to the housing and having a plurality of orifices to create air jets for delivering cooling air to the disk. This showerhead is shaped such that some of its jets are directed radially inward and others are directed normal to the backface of the thrust disk.

By use of these showerheads with these various foil bearing types, the rotating components of the foil bearings can be cooled without a substantial loss of performance of the gas turbine engine.

These and other objects, features and advantages of the present invention are specifically set forth in or will become apparent from the following detailed description of a preferred embodiment of the invention when read in conjunction with the accompanying drawings.

DESCRIPTION OF THE PREFERRED EMBODIMENT

Figure 1:
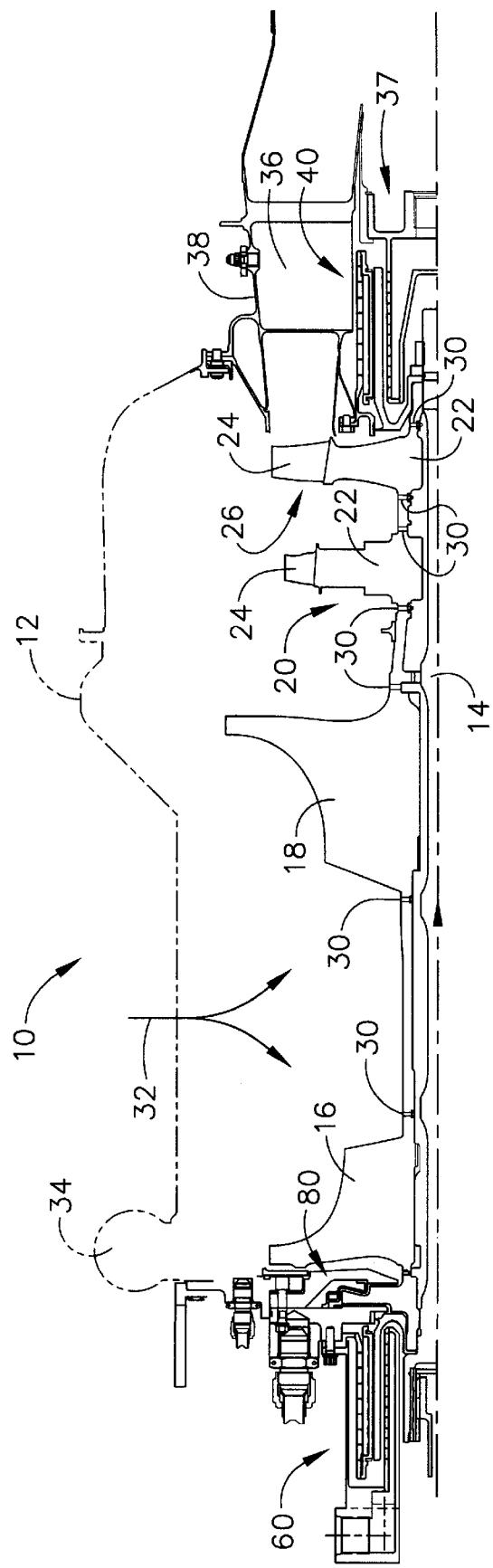
FIG. 1 is a cross-section, schematic of a gas turbine engine having impingement cooled foil bearings contemplated by the present invention.

Referring to FIG. 1, a gas turbine engine is generally denoted by reference numeral 10. The gas turbine engine 10 includes a plurality of rotating components referred to as the rotating assembly mounted within an engine casing or housing 12. The rotating assembly includes at least one shaft 14. Mounted to the shaft 14 and rotating therewith are a load compressor 16, a power section compressor 18, a first turbine stage 20, and a second turbine stage 26. The turbine stages 20, 26 each are comprised of a turbine wheel 22 having a plurality of turbine blades 24 mounted at the perimeters of the wheels 22. Curvic couplings 30 are used to couple adjacent rotating components. The rotating shaft 14 is mounted to the stationary housing 12 by an aft foil bearing assembly 40 and a forward foil bearing assembly 60. A foil thrust bearing 80 is mounted adjacent the load compressor 16 and prevents the rotating assembly from moving axially as the pressure changes within the engine.

In operation load compressor 16 ingests air through an inlet represented by arrow 32. The load compressor compresses the air and provide pressurized bleed through a plenum 34. The power section compressor 18 also ingests inlet air, and provides compressed air to a combustor not shown. In the combustor the air is mixed with fuel and ignited to form a hot, pressurized gas. This gas is than expanded across turbine stages 20 and 26 and then expelled through an exhaust duct 36 defined by an exhaust housing 38 which is part of the casing 12.

Figure 2:
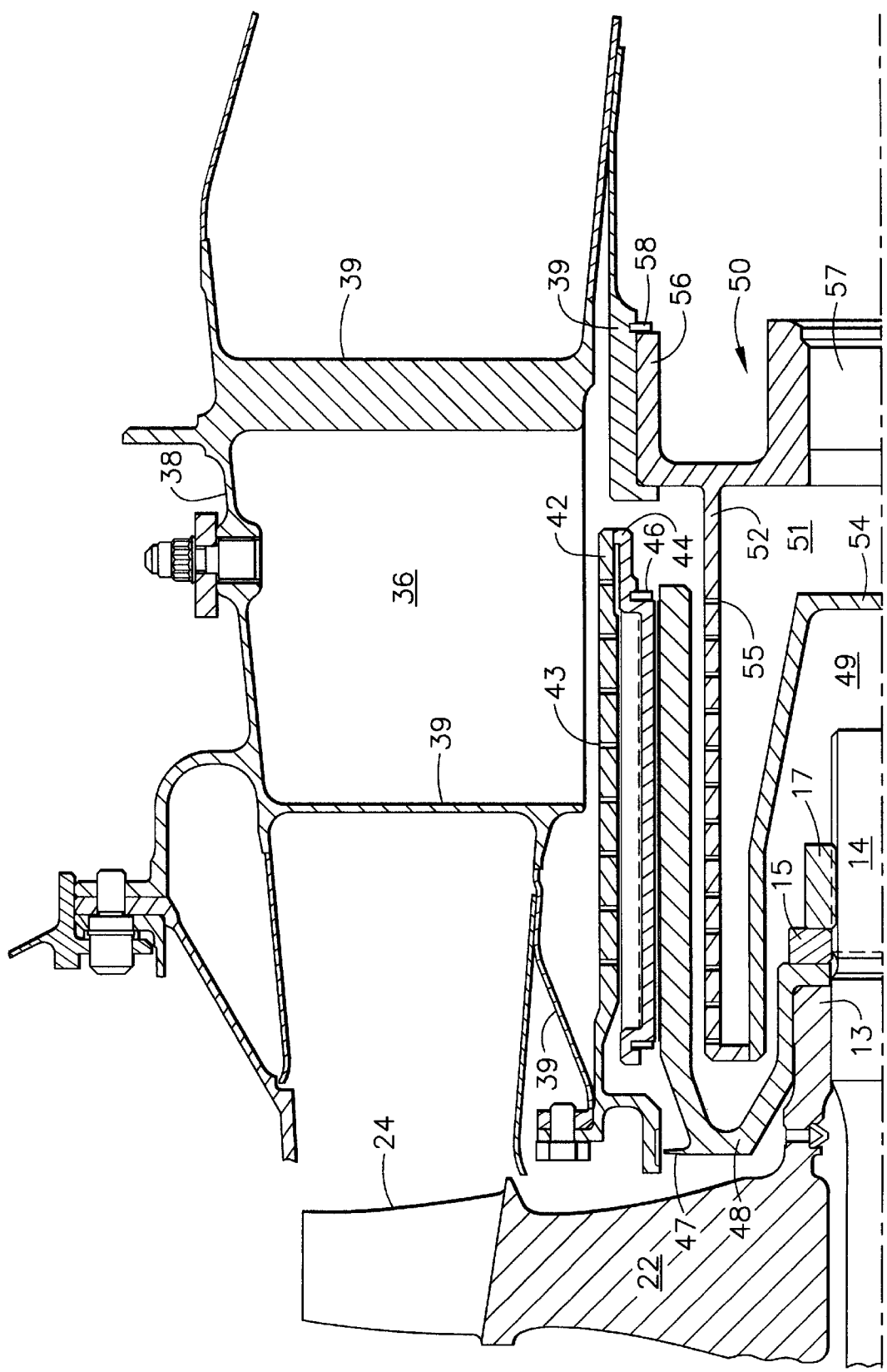
FIG. 2 is an enlarged view of the aft foil bearing assembly of the gas turbine engine of FIG. 1.

Referring now to both FIGS. 1 and 2, the exhaust housing 38 includes a plurality of internal structural walls generally denoted by reference numeral 39 which define a hole 37 coaxial with the centerline of the engine. Disposed between these walls and the rotating assembly is the aft foil bearing assembly 40.

The aft foil bearing assembly 40 includes an annular bearing carrier 42 which is mounted, in a manner familiar to those skilled in the art, to one of the structural members 39. The carrier 42 has a plurality of orifices 43. Disposed within the carrier 42 and welded thereto is an annular foil carrier 44 which carries a plurality of overlapping foils 46. The foils 46 engage a journal 48 which is mounted to the shaft 14 by a shaft coupler 13, spacer 15 and tightening nut 17. A labyrinth seal or knife edge 47 seals between the journal 48 and carrier 42. Importantly, the journal 48 is configured to define a cavity 49 between it and the other rotating components.

Figure 3:
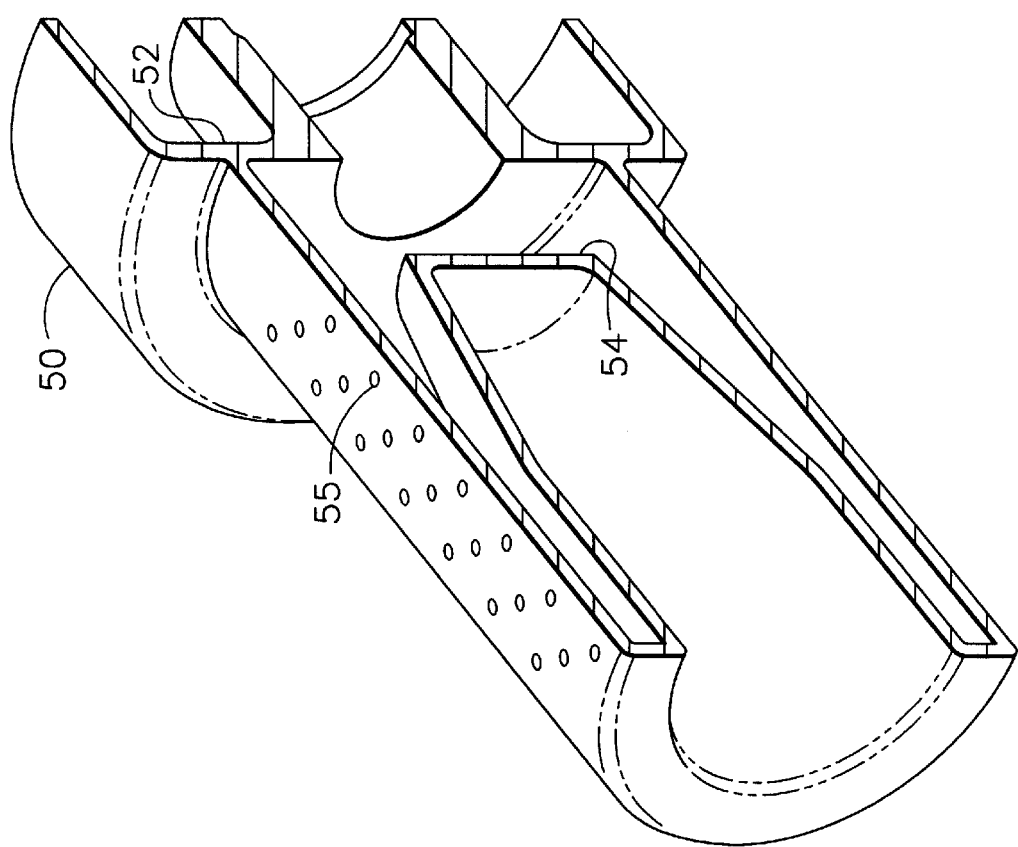
FIG. 3 is a perspective view of a showerhead used in the aft foil bearing assembly of FIGS. 1 and 2.

Referring additionally to FIG.3, a showerhead or nozzle 50 is comprised of two concentric cylindrical members 52 and 54, which preferably are welded together to define an annulus 51. The inner member 54 is configured or shaped to allow for the largest possible spacing between it and any other rotating components. The outer cylindrical member 52 is perforated with a plurality of holes or orifices 55. In the preferred embodiment, there are 220 orifices each having a 0.025 inch diameter and are circumferentially disposed in a helical pattern. The showerhead 50 also has a annular flanged portion 56 which defines central hole 57 which receives a tube, not shown. In a manner familiar to those skilled, the flanged portion 56 is configured to minimize weight. Thus, in the preferred embodiment, the flanged portion 56 is comprised of two radially spaced apart annular walls connected to each other by a radially extending wall. Other configurations, however, are contemplated by the present invention. The showerhead 50 is inserted through hole 37 into cavity 49 and held place by snap ring 58.

In operation, a tube, not shown, brings pressurized cooling air from the exit of the power section compressor 18 to hole 57 and into annulus 51. The air then flows to the orifices 55 which in turn spray the air radially outward to impinge on the inner cylindrical surface of the journal 48. The air then flows out the aft side of the journal 48 and splits into two branches. The first branch, which has most of the flow, flows through the jets 43 to impinge on the outer surface of the bearing carrier 44 and thereby maintain thermal compatibility between the journal 48 and the carrier 44. The second branch flows through the foils 46. On the forward side of the assembly, the two branches merges and flow through labyrinth seal 47 which controls the pressure in the bearing cavity, and prevents backflow of exhaust gas.

Figure 4:
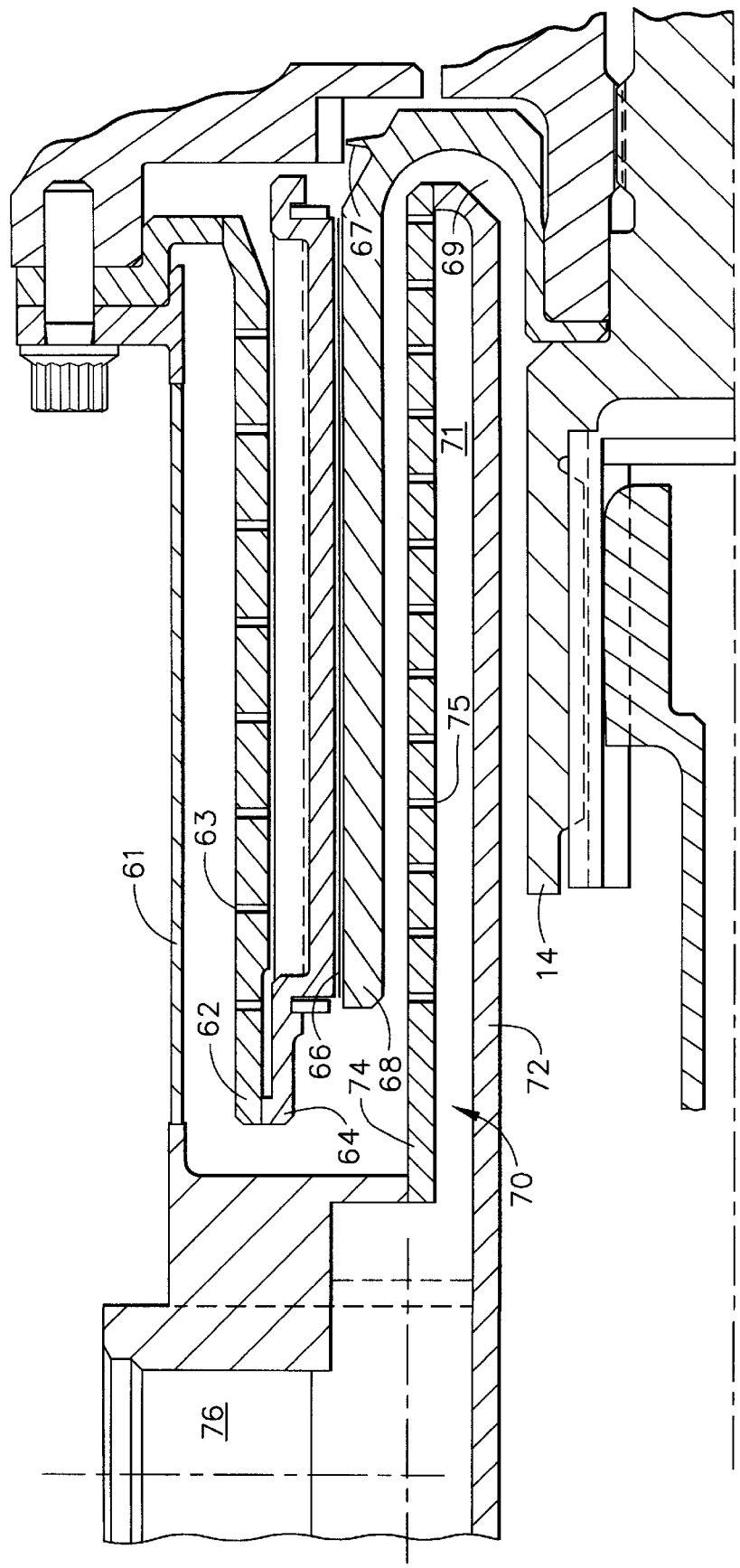
FIG. 4 is an enlarged view of the forward foil bearing assembly of the gas turbine engine of FIG. 1.

The forward foil bearing assembly 60 is very similar to the aft foil bearing assembly 40 both in structure and function. The only differences being in configuration as necessitated by their different location in the gas turbine engine 10. Referring now to both FIGS. 1 and 4, the casing 12 includes an annular wall 61 that circumscribes and is spaced apart from shaft 14. Disposed between the wall 61 and the shaft 14 is the forward foil bearing assembly 60.

The forward foil bearing assembly 60 includes an annular bearing carrier 62 which is mounted, in a manner familiar to those skilled in the art, to wall 61. The carrier 62 has a plurality of holes or jets 63. Disposed within the carrier 62 and welded thereto is an annular foil carrier 64 which carries a plurality of overlapping foils 66. The foils 66 engage a journal 68 which is mounted to the shaft 14. A labyrinth seal or knife edge 67 seals between the journal 68 and carrier 62. Importantly, the journal 68 is configured to define a cavity 69 between it and the other rotating components.

Disposed in the cavity 69 is a showerhead or nozzle 70. The showerhead 70 is comprised of two concentric cylindrical members 72 and 74, which preferably are welded together to define an annulus 71. The outer cylindrical member 74 is perforated with a plurality of orifices 75. In the preferred embodiment, the orifices 75 are circumferentially disposed in a helical pattern. The showerhead 70 has a conduit 76 for receiving a tube, not shown.

In operation, the tube brings pressurized cooling air from the exit of the power section compressor 18 to conduit 76 and into annulus 71. The air then flows to the orifices 75 which in turn spray the air radially outward to impinge on the inner cylindrical surface of the journal 68. The air then flows out the forward side of the journal 68 and splits into two branches. The first branch, which has most of the flow, flows through the jets 63 to impinge on the outer surface of the bearing carrier 64 and thereby maintain thermal compatibility between the journal 68 and the carrier 64. The second branch flows through the foils 66. On the aft side of the assembly, the two branches merges and flow through labyrinth seal 67 which controls the pressure in the bearing cavity.

Figure 5:
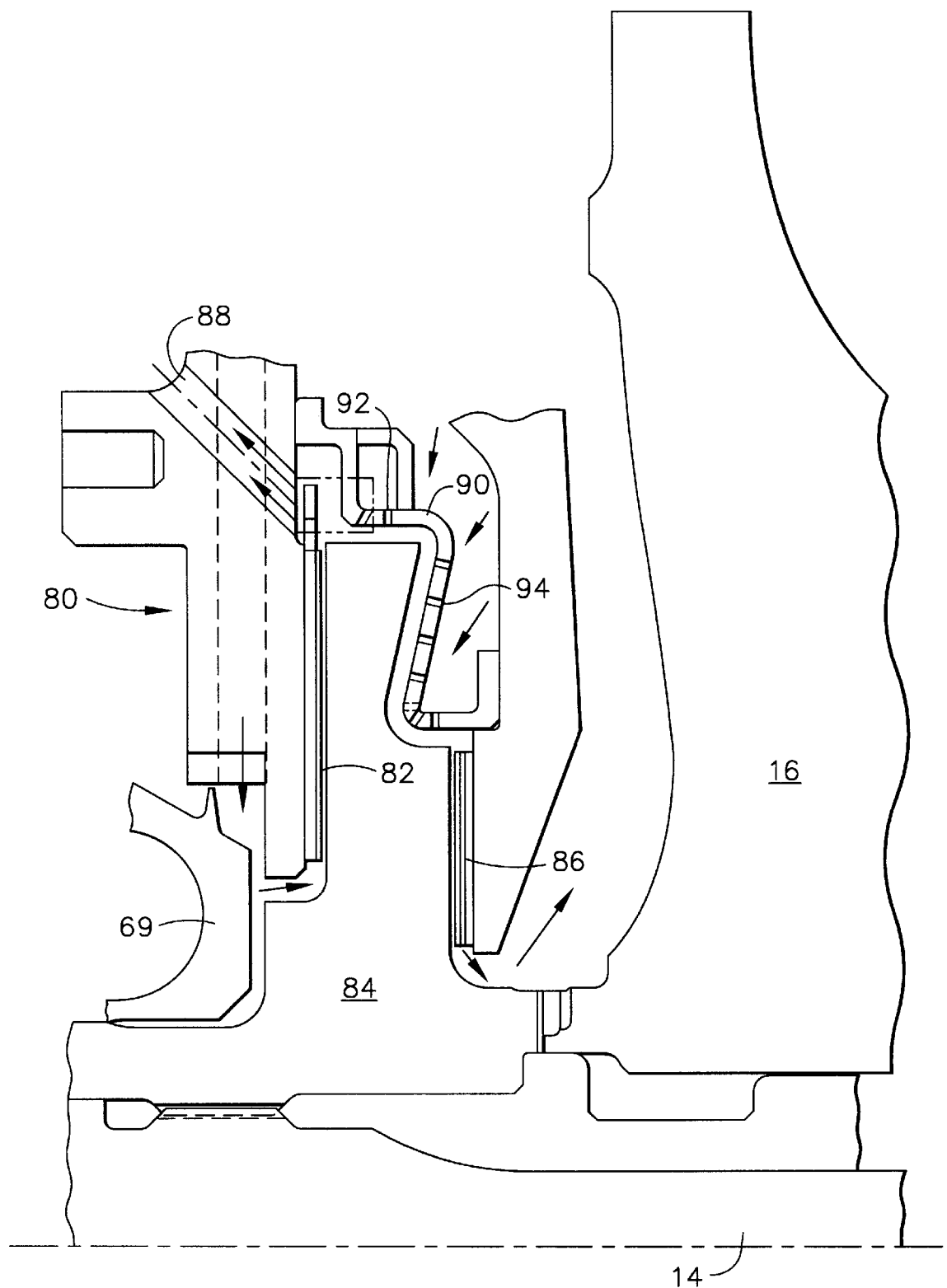
FIG. 5 is an enlarged view of the thrust foil bearing assembly of the gas turbine engine of FIG. 1.
Figure 6:
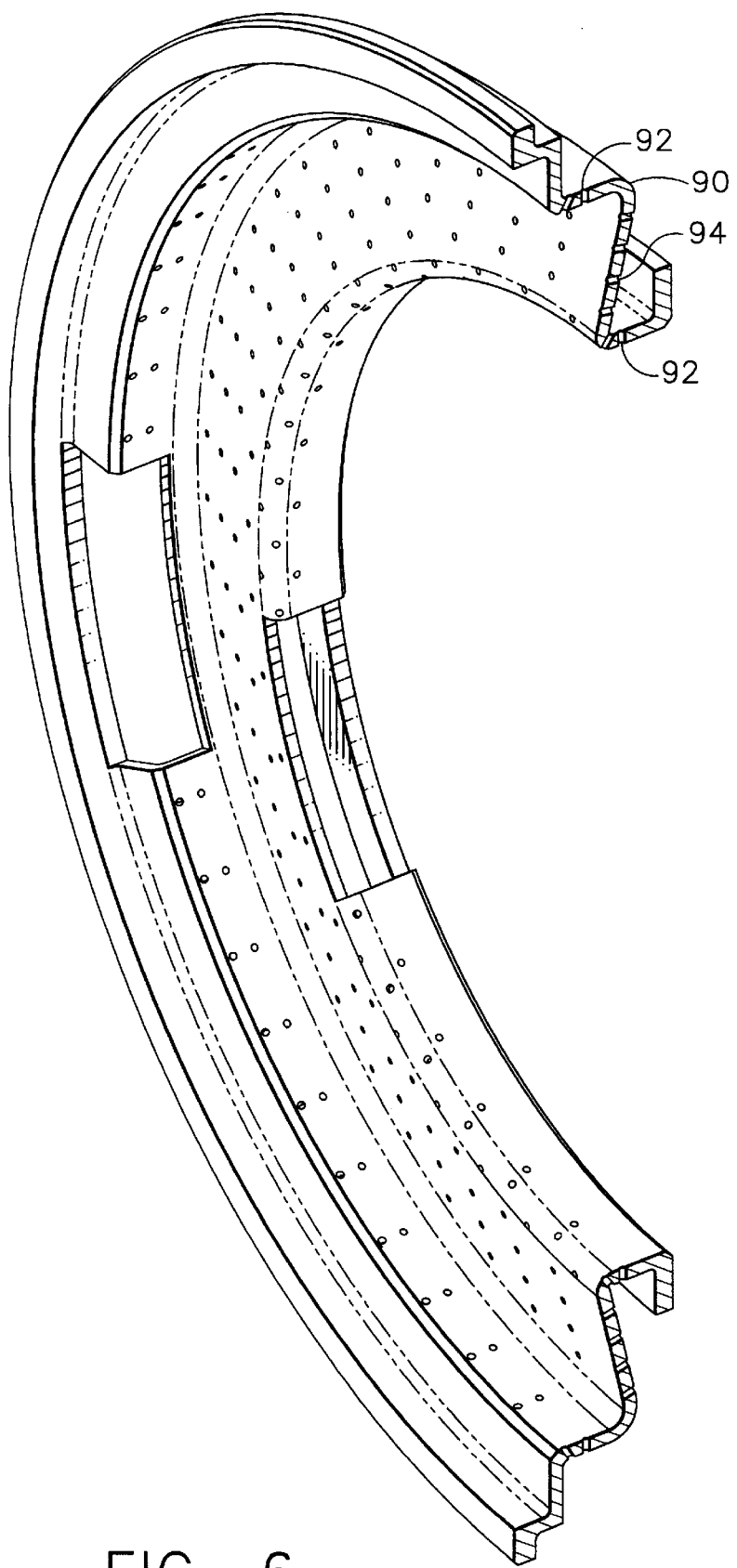
FIG. 6, is a perspective view of the showerhead used in the thrust foil bearing of FIG. 5.

Referring to FIGS. 5 and 6, the thrust foil bearing assembly 80 is disposed between the compressor 16 and the forward foil bearing assembly 60. The assembly 80 includes a conventional large thrust foil bearing 82 on one side of a rotating thrust disk 84 and a smaller thrust foil bearing 86 on the other side. The thrust disk 84 is mounted to the shaft 14. The showerhead or nozzle 90 is shaped such that some of the air orifices 92 are directed radially inward to impinge cooling air onto the cylindrical outer surface of the thrust disk and other orifices 94 are oriented to impinge normal to the exposed backface of the thrust disk. Spent air is vented directly out of the bearing cavity through passages 88 in the casing 12 as shown by the arrows.

By using these showerheads, 50, 70 and 90 the rotating components of journal and thrust foil bearings can be cooled in a gas turbine engine without an unacceptable loss in performance.

Various modifications and alterations to the above-described preferred embodiment will be apparent to those skilled in the art. Accordingly, these descriptions of the invention should be considered exemplary and not as limiting the scope and spirit of the invention as set forth in the following claims.

What is claimed is:

1. A gas turbine engine comprising:
   a housing,
   a rotating assembly mounted for rotation to said housing on at least one foil journal bearing; said foil journal bearing comprising:
   an annular bearing carrier mounted to said housing;
   an annular foil carrier disposed within said bearing carrier and attached thereto, said foil carrier carrying a plurality of overlapping foils;

a journal mounted to said rotating assembly and having an outer surface engaging said foils; and a first showerhead attached to said housing and disposed between said journal and said rotating assembly, said showerhead having an inlet for receiving cooling air and having an outer wall with a first plurality of orifices for delivering said cooling air directly to the inner surface of said journal.

2. The gas turbine engine of claim 1 wherein said first showerhead further comprises an inner wall concentric with said outer wall and attached thereto.

3. The gas turbine engine of claim 2 wherein said inner and outer walls define an annulus for receiving said cooling air.

4. The gas turbine engine of claim 3 wherein said inner wall is configured to allow for the adequate clearance between it and said rotating assembly.

5. The gas turbine engine of claim 1 wherein said outer wall has a flanged portion coupled to said housing and defining a hole for receiving said cooling air.

6. The gas turbine engine of claim 1 wherein said rotating assembly comprises at least one compressor and one turbine mounted on a shaft.

7. The gas turbine engine of claim 6 wherein said shaft is mounted to said housing by said at least one journal foil bearing.

8. The gas turbine engine of claim 1 wherein said bearing carrier has a second plurality of orifices.

9. The gas turbine engine of claim 1 further comprising a foil thrust bearing assembly.

10. The gas turbine engine of claim 9 wherein said foil thrust bearing assembly comprises:

a thrust disk mounted to said rotating assembly;

a first thrust foil bearing on one side of said thrust disk;

a second thrust foil bearing on the other side of said thrust disk; and a second showerhead mounted to said housing and having a third plurality of orifices for delivering cooling air directly to said disk.

11. The gas turbine engine of claim 10 wherein said second showerhead is shaped such that some of said third plurality of jets are directed radially inward and others are directed normal to the backface of said thrust disk.

12. The gas turbine engine of claim 11 wherein said first and second thrust foil bearings have different diameters.

13. A gas turbine engine comprising:

a housing;

a compressor and turbine mounted on a shaft, said shaft journaled for rotation to said housing by forward and aft foil journal bearings;

a thrust disk mounted to said shaft;

a first thrust foil bearing mounted on one side of said thrust disk;

a second thrust foil bearing mounted on the other side of said thrust disk; and a showerhead mounted to said housing and having a plurality of orifices for delivering cooling air directly to said disk.

14. The gas turbine engine of claim 13 wherein said showerhead is shaped such that some of said orifices are directed radially inward and others are directed normal to the backface of said thrust disk.

15. The gas turbine engine of claim 14 wherein said first and second thrust foil bearings have different diameters.

16. A foil bearing assembly comprising:

an annular bearing carrier;

an annular foil carrier disposed within said bearing carrier and attached thereto, said foil carrier carrying a plurality of overlapping foils;

a rotatable journal having an outer surface that engages said foils; and a showerhead circumscribed by said journal and having an inlet for receiving cooling air and an outer wall having a first plurality of orifices for delivering said cooling air directly to the inner surface of said journal.

17. The foil bearing assembly of claim 16 wherein said first showerhead further comprises an inner wall concentric with said outer wall and attached thereto.

18. The foil bearing assembly of claim 17 wherein said inner and outer walls define an annulus for receiving said cooling air.

19. The foil bearing assembly of claim 18 wherein said outer wall has a flanged portion that defines a hole for receiving said cooling air.

20. The foil bearing assembly of claim 19 wherein said bearing carrier has a second plurality of orifices.

* * * * *